United States Patent [19]

Simons

[11] 4,259,230
[45] Mar. 31, 1981

[54] POLYPROPYLENE COMPOSITIONS
[75] Inventor: Donald M. Simons, Wilmington, Del.
[73] Assignee: E. I. Du Pont De Nemours and Company, Wilmington, Del.
[21] Appl. No.: 79,105
[22] Filed: Sep. 26, 1979
[51] Int. Cl.³ .............................................. C08K 3/34
[52] U.S. Cl. ............................ 260/42.46; 260/DIG. 24
[58] Field of Search ................. 260/42.46, DIG. 24; 525/88

[56] References Cited

U.S. PATENT DOCUMENTS

| | | | |
|---|---|---|---|
| 3,354,239 | 11/1967 | Short | 525/88 |
| 3,562,790 | 2/1971 | Coover et al. | 525/88 |
| 3,668,281 | 6/1972 | Drake | 260/45.7 R |
| 4,098,848 | 7/1978 | Morris | 260/DIG. 24 |
| 4,153,587 | 5/1979 | Yui | 260/42.46 |
| 4,211,690 | 7/1980 | Asano et al. | 260/42.46 |

OTHER PUBLICATIONS

Okuno et al.; Mica Reinforced Polypropylene; "Polymer Engineering and Science"; 4/75; vol. 15, No. 4.

*Primary Examiner*—Lewis T. Jacobs

[57] ABSTRACT

Polypropylene compositions having high ignition resistance, flex modulus, and impact resistance are obtained by blending polypropylene homopolymer, a propylene/ethylene copolymer, an EPM or EPDM elastomer having an ethylene content of about 50-65 weight percent and a Mooney viscosity of 35-80, mica, a commercial chlorinated fire retardant, and antimony trioxide in defined proportions. These compositions are particularly suitable for electrical wire insulation and other applications where toughness, stiffness, and ignition resistance are important.

5 Claims, No Drawings

POLYPROPYLENE COMPOSITIONS

BACKGROUND OF THE INVENTION

This invention relates to novel polypropylene compositions characterized by high stiffness, good toughness, and high ignition resistance.

Polypropylene, which is readily available at a reasonable cost, has found many industrial uses because of its desirable physical properties such as ease of fabrication by all conventional methods; high melting point of stereoregular, e.g., isotactic, polypropylene; and compatibility with many other commercial resins, which permits a large number of blends having specific properties. Isotactic polypropylene is inherently brittle, that is, it has a low impact resistance. Brittleness can be reduced either by copolymerizing propylene with ethylene to form block copolymers or by blending homopolypropylene with rubber, for example with EPM or EPDM elastomers. These elastomers are well known to the art. They are copolymers of ethylene with propylene and in the latter case, one or more diene monomers, at least one of which has double bonds that polymerize at different rates.

These copolymers or blends have found many applications, including automobile parts and electric wire insulation. However, one of the problems encountered in applications where fire hazards may be encountered is the lack of ignition resistance of such copolymers or blends. Where sufficient amounts of flameproofing ingredients have been added, those compositions usually have unsatisfactory mechanical properties in that either their impact resistance or stiffness are too low for their intended application.

Accordingly, it is highly desirable to provide a polypropylene composition which would not suffer from such drawbacks.

SUMMARY OF THE INVENTION

It has now been discovered, according to this invention, that a polypropylene composition having good stiffness, impact resistance, and ignition resistance can be obtained by blending together, by weight:

(1) about 20–60 parts of a propylene/ethylene block copolymer containing 10–30 weight percent propylene and 70–90 weight percent ethylene, (2) about 20–50 parts homopolypropylene;

(3) about 20–30 parts of an EPM or EPDM elastomer having an ethylene content of about 50–65 weight percent and a Mooney viscosity of 35–80;

(4) about 25–40 parts of mica;

(5) about 54–60 parts of 1,2,3,4,7,8,9,10,13,13,14,14-dodecachloro-1,4,4a,6a,7,10,10a,12a-octahydro-1,4:7,10-dimethanodibenzocycloctane; and (6) about 27–30 parts of antimony trioxide, $Sb_2O_2$.

DETAILED DESCRIPTION OF THE INVENTION

The compositions of the present invention are prepared by merely combining the required components in correct proportions in conventional blending equipment such as a rubber mill or a mixer, for example, a Banbury mixer. This usually is done above the melting temperature of polypropylene homopolymer. While the order of addition of the components should not affect the properties of the final blend, it is most convenient to add them in the order in which they are listed in the above Summary of the Invention. In this manner, good dispersion is obtained in a short time.

The propylene/ethylene block copolymer can be any commercial block copolymer similar to PROFAX ® 8523 of Hercules, Inc., which is believed to contain about 20–25 weight percent of polyethylene.

Homopolypropylene should be isotactic and may be, for example, of the type corresponding to PROFAX ® 6323 of Hercules, Inc. Most commercial isotactic polypropylenes are suitable in the compositions of this invention.

The EPM or EPDM elastomers suitable in the compositions of this invention can be obtained from several sources. See, for example, Table IIA, pages 840–847 of the review article entitled "Polyolefin Elastomers based on Ethylene and Propylene" by Baldwin et al. in Rubber Chemistry and Technology, Vol. 45, No. 3, Apr. 30, 1972, pages 709 ff. EPM elastomers also are described, among others, in U.S. Pat. Nos. 3,817,884 and 3,819,591, and EPDM elastomers in the following U.S. Pat. Nos: 2,933,480; 2,975,159, 3,093,620; and 3,291,780.

Generally, these EPM or EPDM copolymers are characterized by a medium to high molecular weight, which is reflected in their Mooney viscosity range, and low to medium crystallinity resulting from their ethylene content.

Mica is a known mineral filler, which imparts stiffness to the compositions of the present invention. While the specific type of mica is not critical, light colored material is preferred for most applications, especially where additional pigment or coloring agent is to be incorporated into the compositions of this invention. Thus, for example, mica supplied by The English Mica Company, Stanford, Connecticut, which is mined at King's Mountain, N.C., is preferred to yellow-brown micas such as Suzorite ® (Marietta Resources International, Ltd.) from Canada. 1,2,3,4,7,8,9,10,13,13,14,14-Dodecachloro-1,4,4a,6a,7,10,10a,12a-octahydro-1,4:7,10-dimethanodibenzoyclooctane is a known fire retardant available from Hooker Chemical Co. under the name Dechlorane Plus ® 25.

Antimony trioxide is a commercial product available from several sources.

Dechlorane Plus ® 25/$Sb_2O_3$ combinations containing these components in a weight ratio of about 2:1 are the most effective in providing fire retardancy. The recommended respective proportions of these components are about 58 and 29 parts, the proportions of components (1) through (4) being as recited above. The degree of fire retardancy can be conveniently determined by several methods, including the oxygen test method (ASTM D-2863) and horizontal burn test (ASTM D-635), but the most severe and the most meaningful test is the Underwriters Laboratories vertical burn test (UL-94). The compositions of the present invention have a V-0 rating in the UL-94 test. A combination of high ignition resistance with high impact strength (notched Izod values of 50 j/m or higher) and a high flex modulus (greater than 1.3 GPa) makes these polypropylene compositions unique. Presently available polypropylene compositions fail to satisfy one or more of these requirements.

This invention is now illustrated by the following examples of certain representative embodiments thereof, wherein all parts, proportions, and percentages are by weight:

COMPOUNDING AND PREPARATION OF TEST SPECIMENS

Test compositions were prepared on a rubber mill. The rolls were heated to a temperature of 183° C., sufficient to melt the polypropylene. Components were added on the mill in the same order as listed (see below). The compounded product was sheeted out into a thin sheet and cut into squares approximately 1.5×1.5 cm. In this form the product was fed to a ram extruder for preparation of test specimens. Specimens for the ignition (UL-94), flex modulus (ASTM D-790), and impact (ASTM D-256) tests were molded at 200°–210° C. and measured 12.7×1.27×0.3175 cm.

The compositions tested (parts of each component) as well as the test results are listed in the following Table. These test results, which are given in SI units, were obtained in British units and recalculated.

TABLE

|  | EXAMPLE | | | | | | |
| --- | --- | --- | --- | --- | --- | --- | --- |
|  | 1 | 2 | 3 | 4 | 5 | 6 | 7 |
| Polypropylene/Polyethylene Block Copolymer[a] | 60 | 50 | 40 | 30 | 35 | 30 | 20 |
| Polypropylene homopolymer[b] | 20 | 25 | 30 | 35 | 35 | 40 | 50 |
| EPDM elastomer[c] | 20 | 25 | 30 | 35 | 30 | 30 | 30 |
| Mica (325 mesh) | 30 | 30 | 30 | 35 | 30 | 30 | 30 |
| "Dechlorane Plus" 25 | 58 | 58 | 58 | 58 | 58 | 58 | 58 |
| Antimony Oxide | 29 | 29 | 29 | 29 | 29 | 29 | 29 |
| Flex Modulus GPa | 1.83 | 1.65 | 1.55 | 1.43 | 1.62 | 1.67 | 1.78 |
| Notched Izod Gate End j/m | 54 | 73 | 78 | 105 | 67 | 60 | 55 |
| Notched Izod Far End j/m | 52 | 71 | 81 | 94 | 70 | 62 | 58 |
| UL-94 vertical burn test | V-O | V-O[d] | V-O | V-O | V-O | V-O | V-O |

[a] As exemplified by Hercules "Profax" 8523
[b] As exemplified by Hercules "Profax" 6323
[c] An ethylene/propylene/1,4-hexadiene copolymer, having an ethylene content of about 64%, diene content of about 2.6%, and a Mooney viscosity of 45.
[d] One specimen out of the set of 5 glowed longer than 30 seconds.

I claim:

1. A polypropylene composition having an impact strength of at least 50 j/m in ASTM test D-256, a flex modulus of at least 1.3 GPa in ASTM test D-790, and a V-0 rating in Underwriters Laboratories ignition test UL-94, said composition consisting essentially of the following components, in parts by weight:
   (1) about 20–60 parts of a propylene/ethylene block copolymer containing 10 to 30 weight percent of propylene and 70 to 90 weight percent of ethylene,
   (2) about 20–50 parts homopolypropylene;
   (3) about 20–30 parts of an EPM or EPDM elastomer having an ethylene content of about 50–65 weight percent and a Mooney viscosity of about 35–80;
   (4) about 25–40 parts of mica;
   (5) about 54–60 parts of 1,2,3,4 7,8,9,10,13,13,14,14-dodecachloro-1,4,4a,6a,7,10,10a,12a-octahydro-1,4:7,10-dimethanodibenzocycloctane; and
   (6) about 27–30 parts of antimony trioxide, $Sb_2O_3$.

2. A composition of claim 1 wherein the approximative respective proportions of components (5) and (6) are 58 parts and 29 parts, the proportions of components (1) through (4) being as recited in claim 1.

3. A composition of claim 1 wherein component (3) is an ethylene/propylene copolymer.

4. A composition of claim 1 wherein component (3) is an EPDM elastomer.

5. A composition of claim 4 wherein component (3) is a copolymer or ethylene, propylene, and 1,4-hexadiene.

* * * * *